US009952464B2

United States Patent
Tang

(10) Patent No.: US 9,952,464 B2
(45) Date of Patent: Apr. 24, 2018

(54) LIQUID CRYSTAL DISPLAY PANEL AND METHOD FOR CURING FRAME GLUE

(71) Applicant: Shenzhen China Star Optoelectronics Technology Co., Ltd., Shenzhen, Guangdong (CN)

(72) Inventor: Yuejun Tang, Guangdong (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 0 days.

(21) Appl. No.: 14/417,812

(22) PCT Filed: Jan. 20, 2015

(86) PCT No.: PCT/CN2015/071109
§ 371 (c)(1),
(2) Date: May 6, 2016

(87) PCT Pub. No.: WO2016/106885
PCT Pub. Date: Jul. 7, 2016

(65) Prior Publication Data
US 2016/0246113 A1  Aug. 25, 2016

(30) Foreign Application Priority Data
Dec. 31, 2014 (CN) .......................... 2014 1 0851233

(51) Int. Cl.
*G02F 1/1335* (2006.01)
*G02F 1/1339* (2006.01)
*G02F 1/1333* (2006.01)
*G02B 1/04* (2006.01)

(52) U.S. Cl.
CPC ...... *G02F 1/133528* (2013.01); *G02F 1/1339* (2013.01); *G02F 1/133308* (2013.01);
(Continued)

(58) Field of Classification Search
CPC ............ G02F 1/1339; G02F 1/133514; G02F 1/133528
See application file for complete search history.

(56) References Cited

U.S. PATENT DOCUMENTS

2007/0229733 A1* 10/2007 Suh ................. G02F 1/1339
349/96
2008/0055521 A1* 3/2008 Mizutani .......... G02B 5/3016
349/96
(Continued)

FOREIGN PATENT DOCUMENTS

CN  1472572 A   2/2004
CN  1955822     5/2007
(Continued)

OTHER PUBLICATIONS

Office Action and Search Report, dated Mar. 17, 2017, for Chinese Patent Application No. 201410851233.2.
(Continued)

*Primary Examiner* — James Dudek
(74) *Attorney, Agent, or Firm* — Kim Winston LLP

(57) ABSTRACT

Related to is the technical field of liquid crystal displays, and in particular to a liquid crystal display panel and a frame curing method. The liquid crystal display panel comprises an array substrate, a color filter substrate, and a liquid crystal layer disposed therebetween, the liquid crystal layer being provided with a frame for package in a periphery thereof, wherein the color filter substrate is provided, on a side thereof away from the liquid crystal layer, with a first polarizer, and a second polarizer is arranged between the color filter substrate and the frame, with no black matrix therebetween.

10 Claims, 4 Drawing Sheets

(52) U.S. Cl.
    CPC .......... *G02F 1/133514* (2013.01); *G02B 1/04* (2013.01); *G02F 1/133512* (2013.01); *G02F 2001/133531* (2013.01); *G02F 2001/133548* (2013.01)

(56) References Cited

U.S. PATENT DOCUMENTS

2009/0021675 A1\* 1/2009 Kishioka ........... G02F 1/133555
                                                                             349/106
2011/0194062 A1    8/2011 Lee

FOREIGN PATENT DOCUMENTS

| CN | 102662275 A | 9/2012 |
|----|-------------|--------|
| CN | 102799018   | 11/2012 |
| CN | 102929057 A | 2/2013 |
| CN | 103018968 A | 4/2013 |
| CN | 103257483 A | 8/2013 |
| CN | 103353692 A | 10/2013 |
| CN | 103409084 A | 11/2013 |
| JP | 2008129379 A | 6/2008 |

OTHER PUBLICATIONS

International Search Report and Written Opinion, dated Jan. 20, 2015, China.
Chinese Office Action and Search Report dated Nov. 16, 2016 in Application No. 201410851233.2, China.

\* cited by examiner

LIQUID CRYSTAL DISPLAY PANEL AND METHOD FOR CURING FRAME GLUE

CROSS-REFERENCE TO RELATED APPLICATIONS

The present application claims benefit of Chinese patent application CN 201410851233.2, entitled "Liquid crystal display panel and method for curing frame glue" and filed on Dec. 31, 2014, the entirety of which is incorporated herein by reference.

FIELD OF THE INVENTION

The present disclosure relates to the technical field of liquid crystal displays, and in particular, to a liquid crystal display panel, and a frame curing method.

BACKGROUND OF THE INVENTION

Frame curing is an indispensable step in a manufacturing procedure of a thin film transistor liquid crystal display device. Therefore, when the thin film transistor liquid crystal display device is designed, it is necessary to take relevant influences of a frame curing step into consideration. Existing frame curing manners mainly include a conventional one and a slit one, which will be further explained in the following. However, it is hard to achieve a narrow-framed design through either of the above manners.

FIG. 1 shows a first type of frame curing step in the prior art, i.e., the conventional frame curing step. As shown in FIG. 1, when this frame curing step is used, a liquid crystal display panel is designed to include an array substrate 15, a color filter substrate 11, and an LCD layer (not shown in the figure) disposed therebetween, wherein a periphery of the LCD layer is provided with a frame 16 for package of liquid crystals. The color filter substrate 11 is provided with a black matrix (BM) 12 for shading light on a side thereof facing the LCD layer, and meanwhile, the black matrix 12 is provided with a first alignment film 13 at a portion thereof in contact with the liquid crystals. On the other hand, the array substrate 15 is provided, on a side thereof facing the LCD layer, with a metal layer 17 used for formation of a thin film transistor and the like. Meanwhile, the array substrate 15 is further provided with a second alignment film 14 on a portion thereof in contact with the liquid crystals. As FIG. 1 clearly indicates, the black matrix (BM) 12 is not provided in an inner side of the color filter substrate 11 at a place corresponding to the frame 16. That is, the black matrix 12 of the color filter substrate 11 does not extend to the place corresponding to the frame 16. However, the metal layer 17 provided along an inner side of the array substrate 15 is complete. When the conventional frame curing step is performed, ultraviolet light 18 illuminates the frame 16 to be cured through the color filter substrate 11. Thus, in the frame curing step, there is no requirements on the light transmittance of the array substrate 15, thereby enabling the arrangement of the metal layer 17 free from any influences. However, the black matrix (BM) 12 in the place of the side of the color filter substrate corresponding to the frame 16 should be removed. In order to prevent an occurrence of light leakage from an edge portion of a liquid crystal display panel during normal display when a backlight (BL) normally illuminates from the array substrate 15, edge portions of the liquid crystal display panel except a place where the frame 16 is coated should all be shielded by the black matrix (BM) 12. Meanwhile, the place where the frame 16 is coated will also be covered up with a light proof structure during design. Thus, the edges of the entire liquid crystal display panel are required to be sufficiently large. Therefore, at present, the conventional frame curing step is substantially being used for a large-sized product, but not for a small-sized product, especially a liquid crystal display panel which employs a narrow-framed design and has a gate driver in array (GIA).

FIG. 2 shows a second type of frame curing step in the prior art, i.e., the slit-type frame curing step. As shown in FIG. 2, when this frame curing step is used, a liquid crystal display panel is designed to include an array substrate 25, a color filter substrate 21, and an LCD layer (not shown in the figure) disposed therebetween, wherein a periphery of the LCD layer is provided with a frame 26 for package of liquid crystals. The color filter substrate 21 is provided with a black matrix (BM) 22 for shading light on a side thereof facing the LCD layer, and meanwhile, the black matrix 22 is provided with a first alignment film 23 on a portion thereof in contact with the liquid crystals. On the other hand, the array substrate 25 is provided, on a side thereof facing the LCD layer, with a metal layer 27 used for formation of a thin film transistor and the like. Meanwhile, the array substrate 25 is further provided with a second alignment film 24 on a portion thereof in contact with the liquid crystals. As FIG. 2 clearly indicates, the black matrix (BM) 22 is provided in an inner side of the color filter substrate 21 at a place corresponding to the frame 26. That is, the black matrix 22 of the color filter substrate 21 extends all the way to the place corresponding to the frame 26. However, the metal layer 27 provided along an inner side of the array substrate 25 has slits. When the slit-type frame curing step is performed, ultraviolet light 28 illuminates the array substrate 25. In this case, there are strict requirements on light transmittance of the metal layer 27. However, the black matrix (BM) 22 provided along the inner side of color filter substrate 21 is complete and extends all the way to the place corresponding to the frame 26. Such being the case, light leakage from an edge portion of the liquid crystal display panel will not occur. Meanwhile, it will be unnecessary to cover up the place of the frame 26 during design of the liquid crystal display device. Therefore, the second-type frame curing step can be suitable for a display device using a narrow-framed design. However, as stated above, the second-type frame curing step has requirements on the light transmittance of the metal layer 27 of the array substrate 25, which should be generally higher than 30%. Currently, the metal layer 27 corresponding to the place of the frame 26 is typically formed with a plurality of slits, so as to ensure the light transmittance. Nevertheless, for a product having a gate driver in array (GIA), a thin film transistor thereof will have rather a large size and a low light transmittance. In view of this, at present, the frame 26 is coated at a place which is moved outward accordingly, so as to avoid interference with the gate driver in array (GIA). This, however, will render a narrow-framed design impossible. As can be concluded, the second-type frame curing step is unsuitable for a display device which employs a narrow-framed design and has a gate driver in array (GIA).

SUMMARY OF THE INVENTION

Based on the above, the present disclosure provides a liquid crystal display panel and a frame curing method, which can be favorably used in a liquid crystal display device employing a narrow-framed design and having a gate driver in array.

A liquid crystal display panel according to the present disclosure comprises an array substrate, a color filter substrate, and a liquid crystal layer disposed therebetween, the liquid crystal layer being provided with a frame for package in a periphery thereof, wherein the color filter substrate is provided, on a side thereof away from the liquid crystal layer, with a first polarizer, and a second polarizer is arranged between the color filter substrate and the frame, with no black matrix therebetween. A polarization direction of the second polarizer is perpendicular to that of the first polarizer. Preferably, the frame is selected as a visible light cured frame.

As such, on the one hand, in a frame curing step of the liquid crystal display panel (at this stage the first polarizer has not been attached to the side of the color filter substrate of the liquid crystal display panel as per a conventional treatment procedure in the art), visible light can be allowed to illuminate the liquid crystal display panel through the color filter substrate. Thus, a certain ratio of the visible light can pass through the second polarizer to cure the frame. On the other hand, during normal operations of the liquid crystal display panel (at this stage a manufacturing procedure of the liquid crystal display panel has been completed, and the first polarizer has thus been attached to the side of the color filter substrate of the liquid crystal display panel), light from a backlight source that has entered through the array substrate can partially pass through a third polarizer located outside of the array substrate and the second polarizer, but will not pass through the first polarizer because the polarization direction of the second polarizer is perpendicular to that of the first polarizer. Therefore, no light leakage problem from an edge of the liquid crystal display device would occur during normal use thereof.

Preferably, on a side of the color filter substrate facing the liquid crystal layer, the second polarizer is located at a place corresponding to the frame, and the black matrix is located at a place corresponding to a display area. As such, the black matrix can perform its normal functions, while the second polarizer would allow the visible light to pass therethrough during frame curing, and cooperate with the first polarizer during normal work of the display device to prevent light leakage.

Preferably, the second polarizer is an iodine-polyvinyl alcohol polarizer or a dichroic organic dye polarizer.

Preferably, the second polarizer is a metal wire grid polarizer. Preferably, the second polarizer is an aluminum or gold wire grid polarizer.

Preferably, the second polarizer has a light transmittance in the range from 30% to 65%.

Preferably, the light transmittance of the second polarizer is 43%. This enables the second polarizer to select a polarization direction of light that passes therethrough, and to have a light transmittance of 43% under illumination of visible light. Cooperation of visible light in curing of the frame would bring forth superior curing effects of the entire liquid crystal display panel.

A frame curing method according to the present disclosure at least comprises the following steps: a color filter substrate pre-arrangement step, including arranging a second polarizer and a black matrix on a surface of the color filter substrate facing a liquid crystal layer, in such a way that the second polarizer corresponds to the frame in position, and the black matrix corresponds to a display area in position; and a frame curing step, including allowing visible light to illuminate a liquid crystal display panel through the color filter substrate.

Preferably, the color filter substrate pre-arrangement step includes: plating a polarizing film used to form the second polarizer on the surface of the color filter substrate facing the liquid crystal layer, performing exposure etching, so as to allow the second polarizer to correspond to the frame in position, and arranging the black matrix and a color resistance portion corresponding to the display area.

Preferably, the second polarizer can be one selected from a group consisting of an iodine-polyvinyl alcohol polarizer, a dichroic organic dye polarizer, and a metal wire grid polarizer, and the second polarizer has a light transmittance in the range from 30% to 65%.

As such, on the one hand, according to the liquid crystal display panel and the corresponding frame curing method of the present disclosure, the defects existing in the prior art can be removed through arrangement of the second polarizer at a proper position. As a result, the concept of the present disclosure can be used in both a large-sized product and a small-sized product, especially in a liquid crystal display panel which employs a narrow-framed design and has a gate driver in array.

On the other hand, according to the liquid crystal display panel and the corresponding frame curing method of the present disclosure, the polarization direction of the second polarizer is perpendicular to the polarization direction of the first polarizer located outside of the color filter substrate, such that the problem of light leakage from an edge of the screen adjacent to the frame during normal operation of the liquid crystal display device can be prevented, thereby effectively ensuring quality of the display device.

In addition, in further preferred embodiments of the liquid crystal display panel and the corresponding frame curing method according to the present disclosure, the constituting material and light transmittance of the second polarizer have been further optimized. These optimized embodiments, in conjunction with properties of the frame per se, can generate especially favorable frame curing effects.

The above technical features can be combined in any suitable manners or be substituted by any equivalent technical features, as long as the purpose of the present disclosure can be achieved.

BRIEF DESCRIPTION OF THE DRAWINGS

In the following, the present disclosure will be explained in detail based on embodiments in connection with accompanying drawings, in which.

Figure 1:
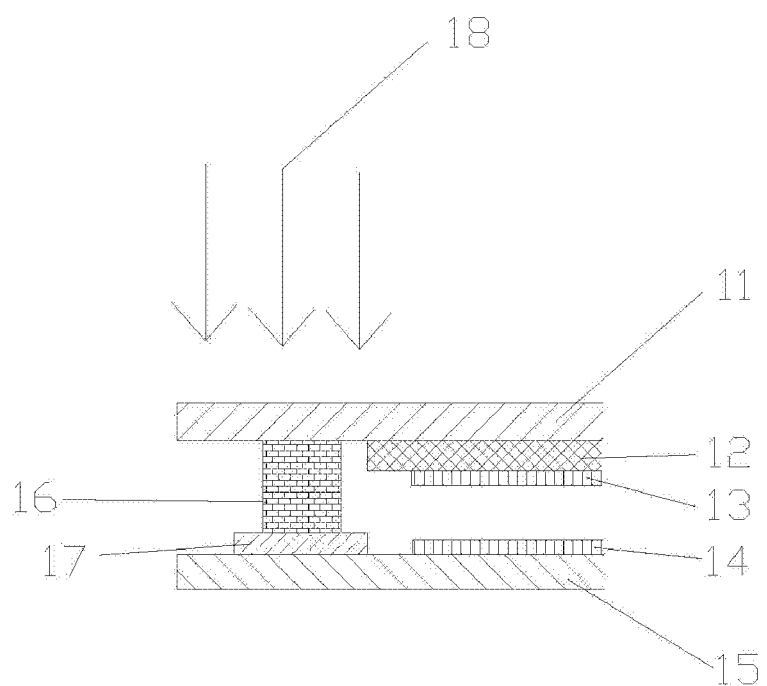
FIG. 1 shows a first frame curing step in the prior art.
Figure 2:
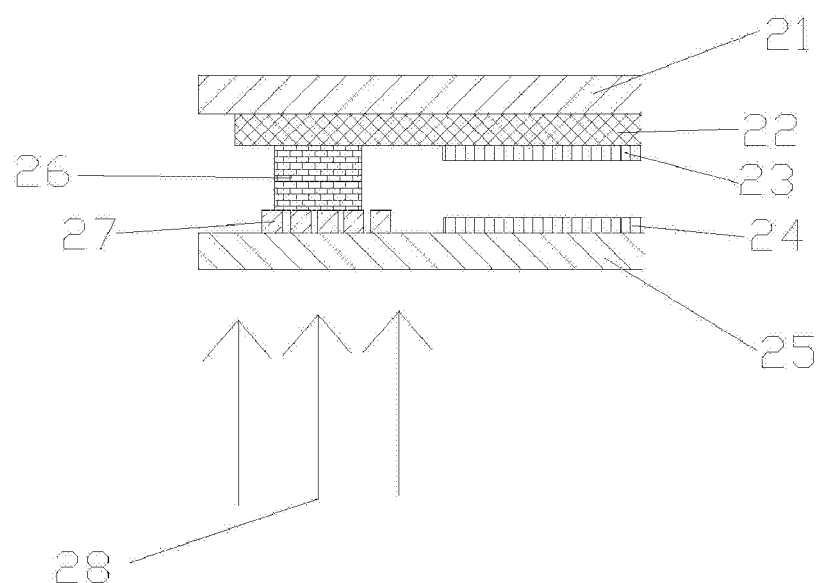
FIG. 2 shows a second frame curing step in the prior art.

In the drawings, the same components are indicated with the same reference signs. The figures are not drawn in accordance with an actual scale.

DETAILED DESCRIPTION OF THE EMBODIMENTS

The present disclosure will be further explained in conjunction with the accompanying drawings.

Figure 3:
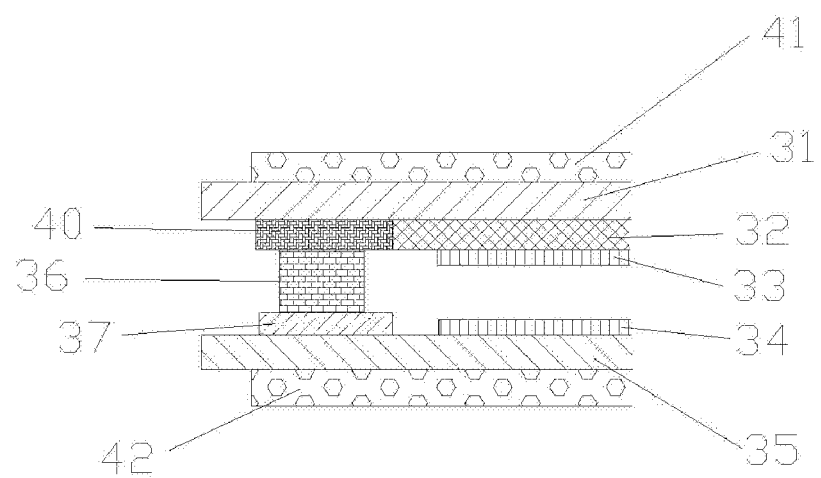
FIG. 3 shows a liquid crystal display panel according to the present disclosure.

FIG. 3 shows a liquid crystal display panel according to the present disclosure. As indicated in FIG. 3, the liquid crystal display panel according to the present disclosure includes an array substrate 35, a color filter substrate 31, and an LCD layer (not shown in the figure) disposed therebetween, wherein a periphery of the LCD layer is provided with a frame 36 for package of the LCD layer. The color filter substrate 31 is provided, on a side thereof away from the LCD layer, with a first polarizer 41; and the array substrate 35 is provided, on a side thereof away from the LCD layer, with a third polarizer 42, wherein the first polarizer 41 is perpendicular to the third polarizer 42 in terms of polarization direction. A second polarizer 40 is arranged between the color filter substrate 31 and the frame 36, with no black matrix disposed therebetween, and the second polarizer 40 has a polarization direction perpendicular to that of the first polarizer 41. As such, on the one hand, in a frame curing step of the liquid crystal display panel (at this stage, the first polarizer 41 has not been attached to the side of the color filter substrate 31 of the liquid crystal display panel as per a conventional treatment process in the art), visible light 38 can be allowed to illuminate the liquid crystal display panel through the color filter substrate 31. Thus, a certain ratio of the visible light 38 can pass through the second polarizer 40 to cure the frame 36. On the other hand, during normal operations of the liquid crystal display panel (at this stage, the manufacturing process of the liquid crystal display panel has been completed, and the first polarizer 41 has thus been attached to the side of the color filter substrate of the liquid crystal display panel), light from a backlight source that has entered through the array substrate 35 can partially pass through the third polarizer 42 located outside of the array substrate 35 and the second polarizer 40, but will not pass through the first polarizer 41 because the polarization direction of the second polarizer 40 is perpendicular to that of the first polarizer 41. Therefore, no light leakage problem from an edge of the liquid crystal display device would occur during normal use thereof. Preferably, the frame 36 can be cured by visible light.

As shown in FIG. 3, an alignment film can be further provided, in order to control a pretilt angle of liquid crystals in the LCD layer disposed between the array substrate 35 and the color filter substrate 31. Specifically, a first alignment film 33 can be provided to the black matrix 32 of the color filter substrate 31, on a surface thereof facing the LCD layer. In particular, the first alignment film 33 can be a PI alignment film. Likewise, a second alignment film 34 can be provided on a surface of the array substrate 35 facing the LCD layer. The second alignment film 34 can specially be a PI alignment film. The array substrate 35 can be further provided, on the surface thereof facing the LCD layer, with a metal film 37 used for constituting a thin film transistor and the like.

Besides, it should be noted that in the embodiment as shown in FIG. 3, the polarization direction of the first polarizer 41 is perpendicular to that of the third polarizer 42. That is, the display device of this embodiment is configured with a constant black mode. However, it can be understood, this would not influence the second polarizer 40 of the present disclosure or with the working principle thereof. That is, in other embodiments, the first polarizer 41 and the third polarizer 42 can have the same polarization direction, in which case, the display device will be configured with a constant while mode. In this regard, it is only necessary to ensure that the polarization direction of the second polarizer 40 located on an inner side of the color filter substrate 31 (facing the LCD layer) is perpendicular to the polarization direction of the first polarizer 41 located on an outer side of the color filter substrate 31. This would prevent an occurrence of light leakage from an edge of a display screen corresponding to the frame 36 of the liquid crystal display panel during normal operation of the display device. Hence, a frame curing effect can be optimized while the normal display quality of the display device is guaranteed.

Reference can be made to FIG. 3 again. As is clearly indicated, on the side of the color filter substrate 31 facing the LCD layer, the second polarizer 40 is located at a position corresponding to the frame 36, while the black matrix 32 is located at a position corresponding to a display area. As such, the black matrix 32 can perform its normal functions, while the second polarizer 40 would allow the visible light 38 to pass through during frame curing, and cooperate with the first polarizer 41 during normal work of the display device to prevent light leakage.

Specifically, the second polarizer 40 can be an iodine polyvinyl alcohol polarizer or a dichroic organic dye polarizer. Nevertheless, in other embodiments, the second polarizer 40 can also be a metal wire grid polarizer, especially an aluminum or a gold wire grid polarizer. The light transmittance of the second polarizer 40 can be in the range from 30% to 65%, and particularly can be 43%. This enables the second polarizer 40 to select a polarization direction of light that passes therethrough, and to have a light transmittance of 43% under illumination of visible light. Cooperation of visible light in curing of the frame 36 would bring forth superior curing effects of the entire liquid crystal display panel.

Figure 4:
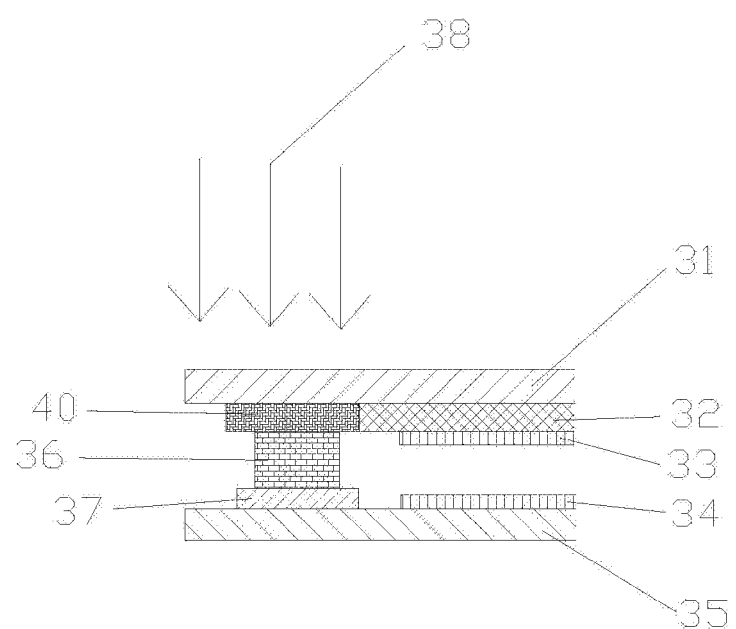
FIG. 4 shows frame curing steps according to a frame curing method of the present disclosure.

The present disclosure further provides a frame curing method. FIG. 4 shows frame curing steps according to the frame curing method of the present disclosure.

The frame curing method according to the present disclosure at least comprises the following steps.

In step a), i.e., a color filter substrate pre-arrangement step, a color filter substrate 31 can be provided, on a surface thereof facing an LCD layer, with a second polarizer 40 and a black matrix 32, so as to enable the second polarizer 40 to correspond to a frame 36 in position, and the black matrix 32 to correspond to a display area in position.

Further, the aforementioned color filter substrate pre-arrangement step can be performed as follows. That is, the color filter substrate 31 can be plated, on the surface thereof facing the LCD layer, with a polarization film which can be used for forming the second polarizer 40, followed by exposure etching to allow the second polarizer 40 to correspond to the frame 36 in position. Subsequently, the black matrix 32 and a color resistant portion (not shown in the figure) corresponding to the display area can be provided.

The second polarizer 40 can be made of different materials, and accordingly can be selected from a group consisting of an iodine polyvinyl alcohol polarizer, a dichroic organic dye polarizer, and a metal wire grid polarizer. The light transmittance of the second polarizer 40 can be selected in the range from 30% to 65%, preferably 43%. This enables the second polarizer 40 to select a polarization direction of light that passes therethrough, and to have a light transmittance of 43% under illumination of visible light. Cooperation of visible light in curing of the frame 36 would bring forth superior curing effects of the entire liquid crystal display panel.

In step b), i.e., a frame curing step, when the frame 36 is being cured, the visible light 38 can be allowed to illuminate the liquid crystal display panel through the color filter substrate 31. Thus, a certain ratio of the visible light 38 can pass through the second polarizer 40 to cure the frame 36.

As such, on the one hand, according to the liquid crystal display panel and the corresponding frame curing method of the present disclosure, the defects existing in the conventional frame curing step (the first-type frame curing step as introduced above in the background information) and the slit-type frame curing step (the second-type frame curing step as introduced above in the background information) can be removed through arrangement of the second polarizer 40 at a proper position. As a result, the concept of the present disclosure can be used in both a large-sized product and a small-sized product, especially in a liquid crystal display panel which employs a narrow-framed design and has a gate driver in array (GIA).

On the other hand, according to the liquid crystal display panel and the corresponding frame curing method of the present disclosure, the second polarizer 40 is arranged at a proper position, and the polarization direction of the second polarizer 40 is perpendicular to the polarization direction of the first polarizer 41 located outside of the color filter substrate 31, such that the problem of light leakage from an edge of the screen adjacent to the frame during normal operation of the liquid crystal display device can be prevented, thereby effectively ensuring quality of the display device.

In addition, in further preferred embodiments according to the liquid crystal display panel and the corresponding frame curing method of the present disclosure, the constituting material and the light transmittance of the second polarizer 40 can be further optimized. These preferred embodiments, in conjunction with properties of the frame 36 per se, can generate especially favorable frame curing effects.

Although the present disclosure herein has been described with reference to particular embodiments, it is to be understood that these embodiments are merely illustrative of the principles and applications of the present disclosure. It is therefore to be understood that numerous modifications may be made to the illustrative embodiments and that other arrangements may be devised without departing from the spirit and scope of the present disclosure as defined by the appended claims. It will be appreciated that the various dependent claims and the features set forth therein can be combined in different ways than presented in the initial claims. It will also be appreciated that the features described in connection with individual embodiments may be shared with others of the described embodiments.

The invention claimed is:

1. A liquid crystal display panel, comprising an array substrate, a color filter substrate, and a liquid crystal layer disposed therebetween, the liquid crystal layer being provided with a frame for package in a periphery thereof, wherein the color filter substrate is provided, on a side thereof away from the liquid crystal layer, with a first polarizer, and a second polarizer is arranged between the color filter substrate and the frame, with no black matrix therebetween, wherein a polarization direction of the second polarizer is perpendicular to that of the first polarizer, and wherein on a side of the color filter substrate facing the liquid crystal layer, the second polarizer is located at a place corresponding to the frame, and the black matrix is located at a place corresponding to a display area.

2. The liquid crystal display panel according to claim 1, wherein the second polarizer is an iodine polyvinyl alcohol polarizer or a dichroic organic dye polarizer.

3. The liquid crystal display panel according to claim 1, wherein the second polarizer is a metal wire grid polarizer.

4. The liquid crystal display panel according to claim 3, wherein the second polarizer is an aluminum or gold wire grid polarizer.

5. The liquid crystal display panel according to claim 1, wherein the second polarizer has a light transmittance in the range from 30% to 65%.

6. The liquid crystal display panel according to claim 5, wherein the light transmittance of the second polarizer is 43%.

7. The liquid crystal display panel according to claim 1, wherein the second polarizer has a light transmittance in the range from 30% to 65%.

8. The liquid crystal display panel according to claim 2, wherein the second polarizer has a light transmittance in the range from 30% to 65%.

9. The liquid crystal display panel according to claim 3, wherein the second polarizer has a light transmittance in the range from 30% to 65%.

10. The liquid crystal display panel according to claim 4, wherein the second polarizer has alight transmittance in the range from 30% to 65%.

* * * * *